(12) United States Patent
Okumura et al.

(10) Patent No.: US 11,316,454 B2
(45) Date of Patent: Apr. 26, 2022

(54) STEPPING MOTOR CONTROL DEVICE, TIMEPIECE AND METHOD FOR CONTROLLING STEPPING MOTOR

(71) Applicant: Seiko Instruments Inc., Chiba (JP)

(72) Inventors: Akihito Okumura, Chiba (JP); Kosuke Yamamoto, Chiba (JP); Kenji Ogasawara, Chiba (JP); Tomohiro Ihashi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 17/004,363

(22) Filed: Aug. 27, 2020

(65) Prior Publication Data

US 2021/0091694 A1    Mar. 25, 2021

(30) Foreign Application Priority Data

Sep. 24, 2019  (JP) .............................. JP2019-172867

(51) Int. Cl.
  *H02P 8/18*  (2006.01)
  *H02P 8/12*  (2006.01)
  *G04C 3/14*  (2006.01)

(52) U.S. Cl.
  CPC .................. *H02P 8/18* (2013.01); *H02P 8/12* (2013.01); *G04C 3/143* (2013.01)

(58) Field of Classification Search
  CPC ... G04C 3/143; H02P 8/00; H02P 8/02; H02P 8/04; H02P 8/08; H02P 8/10; H02P 8/12; H02P 8/165; H02P 8/22; H02P 8/24; H02P 8/30; H02P 8/42
  See application file for complete search history.

(56) References Cited

U.S. PATENT DOCUMENTS

| | | | | |
|---|---|---|---|---|
| 10,498,270 B2 * | 12/2019 | Takeda | ...................... | H02P 8/12 |
| 10,511,248 B2 * | 12/2019 | Saito | ...................... | H02P 25/066 |
| 10,734,932 B2 * | 8/2020 | Fujimori | ................. | H02P 3/025 |
| 10,754,299 B2 * | 8/2020 | Takyoh | ...................... | H02P 8/02 |

FOREIGN PATENT DOCUMENTS

JP     2006-226927 A    8/2006

* cited by examiner

*Primary Examiner* — Antony M Paul
(74) *Attorney, Agent, or Firm* — Crowell & Moring LLP

(57) ABSTRACT

A stepping motor control device is configured to drive a stepping motor by applying a normal drive pulse or a fixed pulse having an energy larger than that of the normal drive pulse. The stepping motor control device includes a determination unit configured to, based on whether or not a pulse applied to the stepping motor before the normal drive pulse is the fixed pulse, determine whether or not to add a degaussing pulse is applied to the normal drive pulse, the degaussing pulse being a pulse for canceling a residual magnetic flux generated in a stator of the stepping motor when the fixed pulse; and a drive control unit configured to, based on a determination result of the determination unit, drive the stepping motor with the normal drive pulse to which the degaussing pulse is added.

11 Claims, 10 Drawing Sheets

STEPPING MOTOR CONTROL DEVICE, TIMEPIECE AND METHOD FOR CONTROLLING STEPPING MOTOR

RELATED APPLICATIONS

This application claims priority to Japanese Patent Application No. 2019-172867, filed on Sep. 24, 2019, the entire content of which is incorporated herein by reference.

BACKGROUND OF THE INVENTION

1. Field of the Invention

Embodiments of the present invention relate to a stepping motor control device, a timepiece and a stepping motor control method.

2. Description of the Related Art

There is a technique in related art of, in a stepping motor control method used for driving hands of a timepiece, detecting an induced voltage after rotation of a rotor, so as to detect that the rotor does not rotate even though an energy is given to the stepping motor. In the related art, when it is detected that the rotor is not rotated, hand movement is performed by further applying a correction drive pulse to the stepping motor. However, in the hand movement after the hand movement is performed due to the correction drive pulse, a part of given energy is consumed to degauss residual magnetism due to application of the correction drive pulse. Therefore, there is a problem that energy that can be used for the hand movement is reduced.

In order to solve such a problem, a technique is known in which energy given to the stepping motor after the correction driving is set to be larger than energy given to the stepping motor in a case other than after the correction driving (for example, see JP-A-2006-226927).

Since the energy of the correction drive pulse is large, according to the technique as described in related art of JP-A-2006-226927, it is necessary to give a larger amount of energy to degauss the residual magnetism generated by the correction drive pulse. Therefore, the technique as described in the related art of Patent Literature 1 wastes energy. That is, the stepping motor control method according to the related art has a problem of low energy efficiency.

SUMMARY OF THE INVENTION

Embodiments of the invention are made in view of such a situation, and one of objects of the invention is to provide a stepping motor control device, a timepiece, and a stepping motor control method having high energy efficiency.

A stepping motor control device according to one aspect of the invention is configured to drive a stepping motor by applying a normal drive pulse or a fixed pulse having an energy larger than that of the normal drive pulse. The stepping motor including a stator provided with a rotor through hole; a rotor rotatably arranged in the rotor through hole; and a coil provided on the stator. The stepping motor control device includes a determination unit configured to, based on whether or not a pulse applied to the stepping motor before the normal drive pulse is the fixed pulse, determine whether or not to add a degaussing pulse is applied to the normal drive pulse, the degaussing pulse being a pulse for canceling a residual magnetic flux generated in the stator when the fixed pulse; and a drive control unit configured to, based on a determination result of the determination unit, drive the stepping motor with the normal drive pulse to which the degaussing pulse is added.

Further, in the stepping motor control device according to one aspect of the invention, when the determination unit determines that the pulse applied to the stepping motor before the normal drive pulse is the fixed pulse, the drive control unit drives the stepping motor with the normal drive pulse to which the degaussing pulse is added.

Further, in the stepping motor control device according to one aspect of the invention, an on-time in one cycle of the fixed pulse is longer than that of the normal drive pulse.

Further, in the stepping motor control device according to one aspect of the invention, a cycle of the normal drive pulse for moving a hand by a predetermined angle and a cycle of the fixed pulse coincide with each other.

Further, in the stepping motor control device according to one aspect of the invention, a cycle of the fixed pulse is shorter than a cycle of the normal drive pulse.

Further, the stepping motor control device according to one aspect of the invention further includes a calculation unit configured to decide an energy of the degaussing pulse based on the energy of the fixed pulse applied before the normal drive pulse. The drive control unit is configured to add the degaussing pulse to the normal drive pulse next to the applied fixed pulse, the degaussing pulse having the energy decided by the calculation unit.

Further, in the stepping motor control device according to one aspect of the invention, the calculation unit is configured to add to the normal drive pulse the degaussing pulse having the energy based on the energy of the fixed pulse applied before the normal drive pulse, and add a second degaussing pulse having an energy smaller than that of the degaussing pulse to the normal drive pulse that is further next.

Further, in the stepping motor control device according to one aspect of the invention, the calculation unit is configured to decide a voltage value of the degaussing pulse based on the energy of the fixed pulse applied before the normal drive pulse.

A stepping motor control device according to one aspect of the invention is configured to drive a stepping motor by applying a normal drive pulse or a fixed pulse having an energy larger than that of the normal drive pulse. The stepping motor includes a stator provided with a rotor through hole; a rotor rotatably arranged in the rotor through hole; and a coil provided on the stator. The stepping motor control device includes a drive voltage determination unit configured to, based on whether or not a pulse applied to the stepping motor before the normal drive pulse is the fixed pulse, determine a voltage of the normal drive pulse; and a drive control unit configured to, based on a determination result of the drive voltage determination unit, drive the stepping motor with the normal drive pulse.

A timepiece according to one aspect of the invention includes the stepping motor control device described above.

A stepping motor control method according to one aspect of the invention is a stepping motor control method for driving a stepping motor by applying a normal drive pulse or a fixed pulse having an energy larger than that of the normal drive pulse. The stepping motor includes a stator provided with a rotor through hole; a rotor rotatably arranged in the rotor through hole; and a coil provided on the stator. The stepping motor control method includes, based on whether or not a pulse applied to the stepping motor before the normal drive pulse is the fixed pulse, determining whether or not to add a degaussing pulse is applied to the normal drive pulse, the degaussing pulse being a pulse for canceling a residual magnetic flux generated in the stator when the fixed pulse; and based on a result of the determination, driving the stepping motor with the normal drive pulse to which the degaussing pulse is added.

DETAILED DESCRIPTION OF THE PREFERRED EMBODIMENTS

Examples of a timepiece according to embodiments will be described with reference to the drawings.

Figure 1:
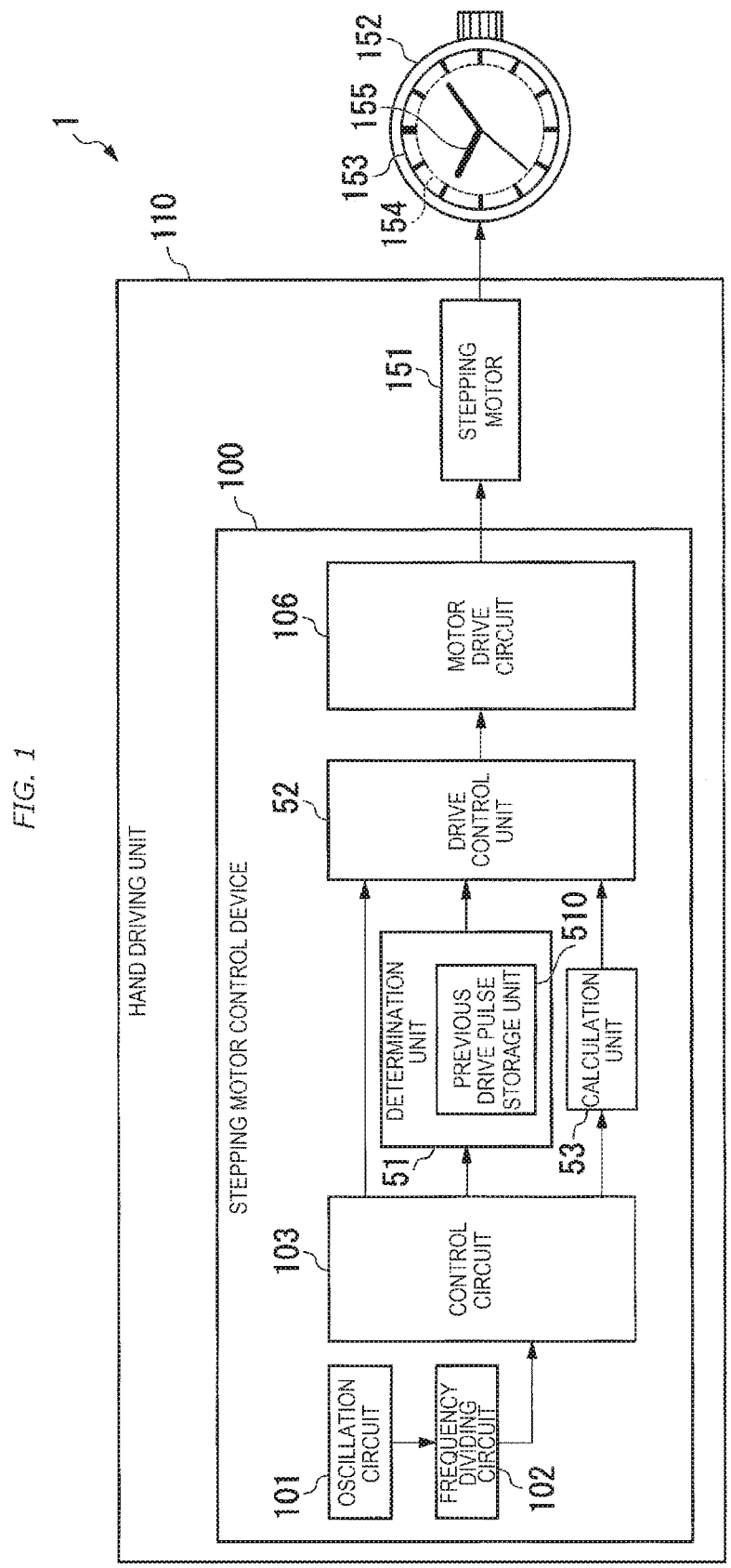
FIG. 1 is a diagram showing an example of a configuration of a timepiece according to an embodiment.

FIG. 1 is a diagram showing an example of a configuration of the timepiece 1 according to the embodiment.

[Functional Configuration of Timepiece 1]

The timepiece 1 includes a hand driving unit 110, a timepiece case 152, an analog display unit 153, a movement 154, and a hand 155.

The timepiece case 152 is a housing that accommodates the hand driving unit 110, the analog display unit 153, the movement 154, and the hand 155. The hand driving unit 110 is included in the movement 154.

The analog display unit 153 is a dial on which an indicator is engraved. The movement 154 includes a mechanical mechanism for driving each unit of the timepiece 1. The hand 155 includes an hour hand, a minute hand, a second hand, and other hands.

The hand driving unit 110 includes a stepping motor control device 100 and a stepping motor 151.

The stepping motor control device 100 includes an oscillation circuit 101, a frequency dividing circuit 102, a control circuit 103, a determination unit 51, a drive control unit 52, a calculation unit 53, and a motor drive circuit 106.

The oscillation circuit 101 generates a signal having a predetermined frequency and transmits the signal to the frequency dividing circuit 102. The frequency dividing circuit 102 divides the signal received from the oscillation circuit 101, generates a timepiece signal serving as a reference for timing, and transmits the generated timepiece signal to the control circuit 103.

The control circuit 103 transmits a control signal to respective units of the timepiece 1 based on the timepiece signal or the like received from the frequency dividing circuit 102, and controls operations of the respective units of the timepiece 1.

The determination unit 51 determines whether or not to correct a drive pulse based on the control signal that drives the stepping motor 151, which is received from the control circuit 103, and a previous control signal that previously drove the stepping motor 151. Specifically, the determination unit 51 includes a previous drive pulse storage unit 510. The previous drive pulse storage unit 510 stores information of a previous drive pulse that previously drove the stepping motor 151. The determination unit 51 compares the control signal received from the control circuit 103 with the information of the previous drive pulse, and determines whether or not to correct the drive pulse.

The determination unit 51 transmits information related to whether or not to correct the drive pulse to the drive control unit 52. The determination unit 51 stores the information of the drive pulse in the previous drive pulse storage unit 510.

When the determination unit 51 determines that the drive pulse should be corrected, the calculation unit 53 calculates correction energy thereof. The calculation unit 53 transmits information related to the calculated correction energy to the drive control unit 52.

In this example, the calculation unit 53 is described as being included in the stepping motor control device 100, but the calculation unit 53 may also be included in the determination unit 51.

The drive control unit 52 receives the control signal from the control circuit 103, receives the information related to whether or not to correct the drive pulse from the determination unit 51, and receives the information related to the correction energy from the calculation unit 53. The drive control unit 52 controls the motor drive circuit 106 to drive the stepping motor 151 based on the received information.

The motor drive circuit 106 is configured with a plurality of switching elements (not shown). In this example, the switching element is a P-channel metal-oxide-semiconductor field-effect transistor (MOSFET) or an N-channel MOSFET. The motor drive circuit 106 drives the stepping motor 151 according to a connection state of the plurality of switching elements included in the motor drive circuit 106. The connection state of the plurality of switching elements is controlled by the drive control unit 52.

The stepping motor 151 moves the hand 155 via the movement 154 according to the drive pulse output from the stepping motor control device 100.

Figure 2:
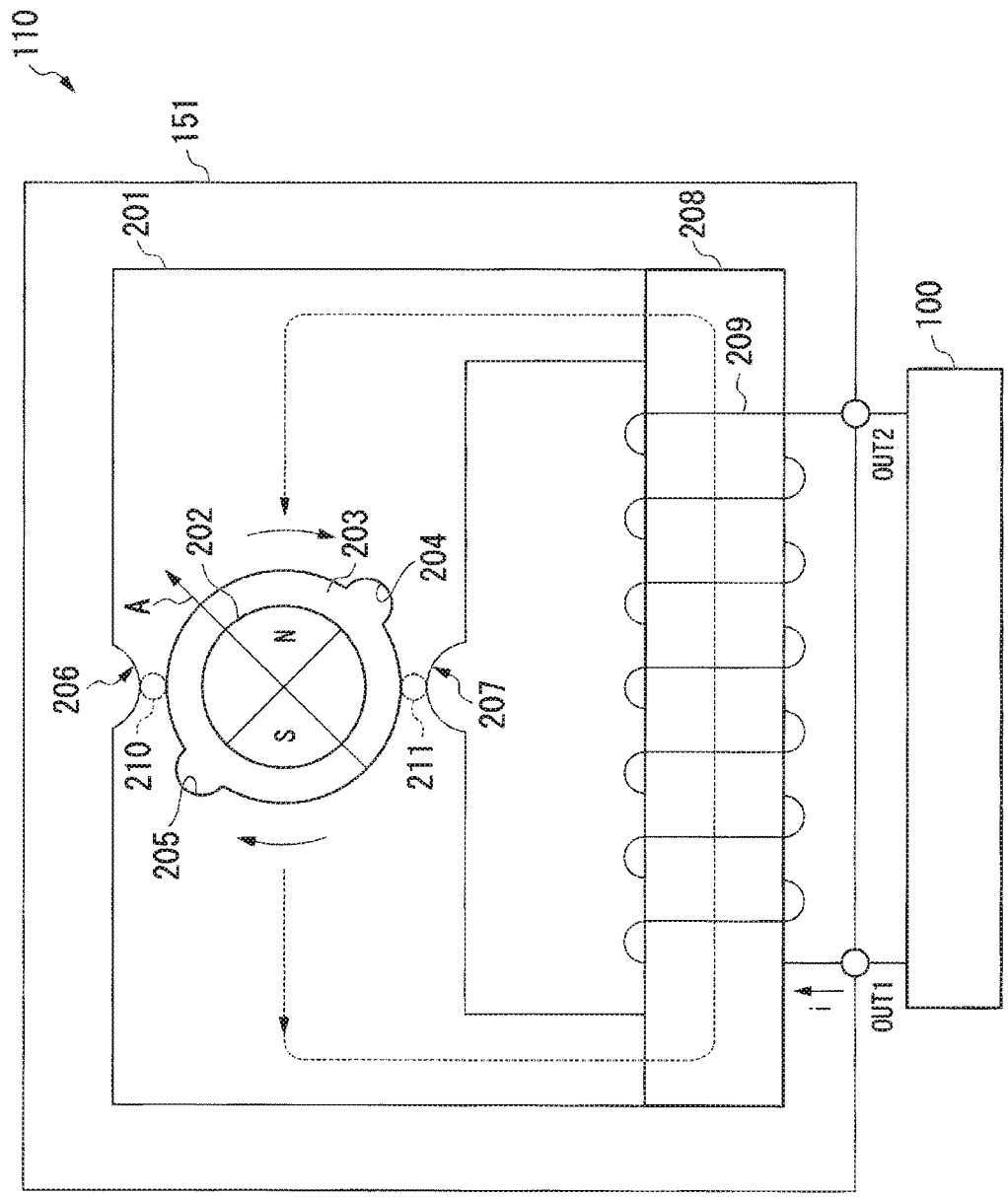
FIG. 2 is a diagram showing an example of a configuration of a hand driving unit according to the embodiment.

FIG. 2 is a diagram showing an example of a configuration of the hand driving unit 110 according to the embodiment.

The hand driving unit 110 includes the stepping motor 151 and the stepping motor control device 100.

[Configuration of Stepping Motor 151]

The stepping motor 151 includes a stator 201, a rotor 202, a rotor accommodating through hole 203, an inner notch 204, an inner notch 205, an outer notch 206, an outer notch 207, a magnetic core 208, and a coil 209. Hereinafter, the rotor accommodating through hole 203 will also be referred to as a rotor through hole.

The magnetic core 208 is a member formed of a magnetic material, and is bonded to both ends of the stator 201.

The coil 209 is wound around the magnetic core 208. One end of the coil 209 is connected to a terminal OUT1 and another end of the coil 209 is connected to a terminal OUT2. The coil 209 generates a magnetic flux when a drive current i flows through the coil 209.

The stator 201 is a member formed of a magnetic material. The stator 201 gives the magnetic flux generated by the coil 209 to the rotor 202.

The rotor 202 is formed in a cylindrical shape, and is inserted in a state rotatable with respect to the rotor accommodating through hole 203 formed in the stator 201. That is, the stepping motor 151 includes the stator 201 provided with the rotor accommodating through hole 203, the rotor 202 rotatably arranged in the rotor accommodating through hole 203, and the coil 209 provided on the stator 201.

The rotor 202 is magnetized and thus has an N pole and an S pole. In the following description, an axis from the S pole to the N pole of the rotor 202 is also referred to as a magnetic pole axis A, and a direction from the S pole of to the N pole of the magnetic pole axis A is also referred to as a positive direction of the magnetic pole axis A (or simply a direction of the magnetic pole axis A).

The rotor 202 is rotated in a normal rotation direction to rotate the hand 155 clockwise via a train wheel, and is rotated in a reverse rotation direction to rotate the hand 155 counterclockwise via the train wheel. That is, the rotor 202 is rotated in the normal rotation direction to rotate the hand 155 clockwise, and is rotated in the reverse rotation direction to rotate the hand 155 in a reverse rotation direction that is a direction opposite to the normal rotation direction.

The inner notches 204 and 205 are cutouts formed in a wall surface of the rotor accommodating through hole 203, and decide a stop position of the rotor 202 with respect to the stator 201. That is, for example, as shown in FIG. 2, when the coil 209 is not excited, the rotor 202 stops at a position where the magnetic pole axis is orthogonal to a line segment that connects the inner notches 204 and 205.

The outer notch 206 is a notch formed on a curved outer side of the stator 201, and the outer notch 207 is a notch formed on a curved inner side of the stator 201. A saturable portion 210 is formed between the outer notch 206 and the rotor accommodating through hole 203, and a saturable portion 211 is formed between the outer notch 207 and the rotor accommodating through hole 203.

Here, the saturable portions 210 and 211 are not magnetically saturated by the magnetic flux of the rotor 202, and when the coil 209 is excited, the saturable portions 210 and 211 are magnetically saturated and a magnetic resistance thereof is increased.

[Example of Driving Stepping Motor 151]

The motor drive circuit 106 causes the coil 209 to generate the drive current i by applying the drive pulse between the terminals (the first terminal OUT1 and the second terminal OUT2) of the coil 209.

The stepping motor control device 100 reverses a direction of the drive current i flowing through the coil 209 according to the direction of the magnetic pole axis A at the stop position of the rotor 202, so that the rotor 202 is rotated in a certain direction (for example, the normal rotation direction).

As an example, a situation in which the rotor 202 is rotated in the normal rotation direction will be described. When the stepping motor control device 100 supplies the drive pulse between the first terminal OUT1 and the second terminal OUT2 of the coil 209, the magnetic flux is generated in the stator 201. As a result, the saturable portions 210 and 211 are saturated, and the magnetic resistance of the saturable portions 210 and 211 increases. Then, due to interaction between magnetic poles generated by the stator 201 and magnetic poles of the rotor 202, the rotor 202 is rotated 180 degrees counterclockwise from a position shown in FIG. 2 and stops stably. By this rotation of about 180 degrees, the hand 155 of the timepiece 1 can move by a specified amount (by one indicator). An operation of the specified amount may be referred to as one step. A train wheel having an appropriate reduction ratio is appropriately arranged between the rotor 202 and the hand 155, so that the operation of the specified amount is performed. In an example of the present embodiment, the hand 155 moves by one second due to the operation of the one step.

In a case where the rotor 202 is in a state shown in FIG. 2, when the stepping motor control device 100 supplies the drive pulse between the first terminal OUT1 and the second terminal OUT2 of the coil 209, a current flows through the coil 209. In this example, when a pulse that has a high potential at the first terminal OUT1 and a low potential at the second terminal OUT2 (hereinafter referred to as a positive direction) is applied, a current flows in the direction of the current i. When the current flows through the coil 209, the magnetic flux is generated in the stator 201. Due to this magnetic flux, the rotor 202 rotates counterclockwise from the state of FIG. 2 by approximately 180 degrees and stops stably.

Further, when the stepping motor control device 100 applies a pulse that has a low potential at the first terminal OUT1 and has a high potential at the second terminal OUT2 (hereinafter referred to as a negative direction) when the rotor 202 is in a state of being rotated approximately 180 degrees from the state of FIG. 2, a magnetic flux in a direction opposite to that when the pulse is applied in the positive direction is generated in the stator 201. As a result, the saturable portions 210 and 211 are first saturated, and then the interaction between the magnetic poles generated by the stator 201 and the magnetic poles of the rotor 202 causes the rotor 202 to further rotate counterclockwise by approximately 180 degrees and stop stably. At this time, the rotor 202 returns to the state of FIG. 2.

In this manner, by supplying the signals (alternating signals) having different polarities with respect to the coil 209, the rotor 202 is continuously rotated counterclockwise by approximately 180 degrees each time.

In the present embodiment, the stepping motor control device 100 drives the stepping motor 151 with the drive pulse. In this example, the drive pulse includes a normal drive pulse NP that moves the hand 155 by one second due to the operation of one step, and a fixed pulse FP other than the normal drive pulse NP.

Here, the normal drive pulse NP and the fixed pulse FP will be described.

[Normal Drive Pulse NP]

Figure 3:
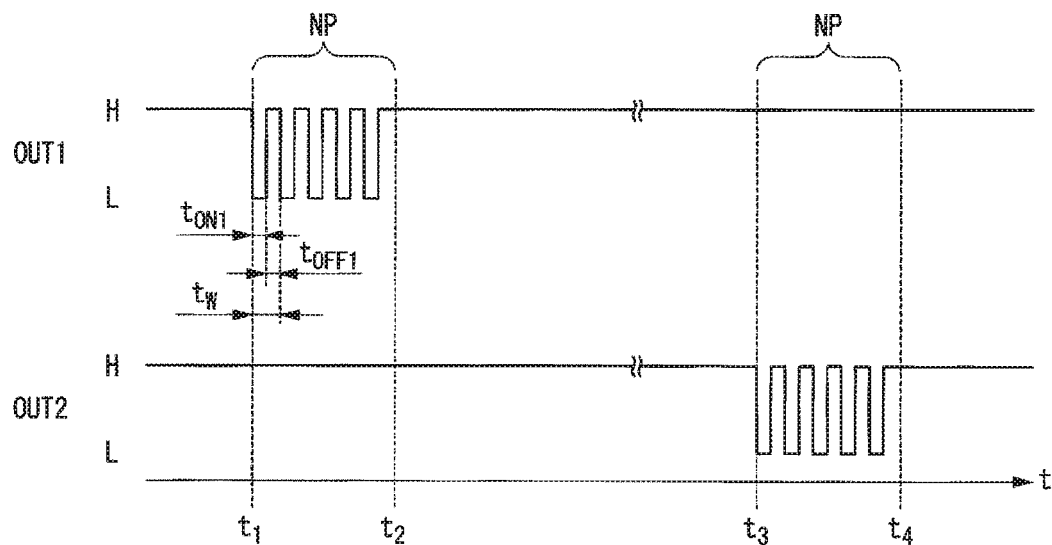
FIG. 3 is a diagram showing an example of a normal drive pulse according to the embodiment.

FIG. 3 is a diagram showing an example of the normal drive pulse NP according to the embodiment.

FIG. 3 shows changes over time in the potential of the first terminal OUT1 and the potential of the second terminal OUT2 of the coil 209. In the same figure, a horizontal axis indicates time and a vertical axis indicates the potentials of the first terminal OUT1 and the second terminal OUT2. In the same figure, the potentials of the first terminal OUT1 and the second terminal OUT2 are indicated by two values, a high potential H and a low potential L.

Before a time $t_1$, the potential of the first terminal OUT1 is the high potential H, and the potential of the second terminal OUT2 is the high potential H. In this state, a current does not flow through the coil 209 since the two terminals of the coil 209 (between the first terminal OUT1 and the second terminal OUT2) are controlled to have the same potential.

The stepping motor control device 100 controls the first terminal OUT1 to have the low potential L at $t_1$. When the first terminal OUT1 is controlled to have the low potential L, a potential difference is generated between both terminals of the coil 209, so that a current flows through the coil 209. When the current flows through the coil 209, the magnetic flux is generated in the stator 201 as described above, and the rotor 202 starts rotating.

The stepping motor control device 100 controls the first terminal OUT1 to have the high potential H after an on-time $t_{ON1}$ is elapsed. Further, the stepping motor control device 100 controls the first terminal OUT1 to have the low potential L again after an off-time $t_{OFF1}$ is elapsed. That is, the stepping motor control device 100 rotates the rotor 202 by alternately controlling (chopping control) the first terminal OUT1 to be in states of having the high potential H and the low potential L. A sum of the on-time $t_{ON1}$ and the off-time $t_{OFF1}$ is referred to as a chopping cycle $t_{W1}$.

In the normal drive pulse NP, an energy given to the stepping motor 151 by the stepping motor control device 100 is controlled by a ratio of the on-time $t_{ON1}$ to the chopping cycle $t_{W1}$ (hereinafter, referred to as a duty ratio) and the number of applied pulses.

That is, the normal drive pulse NP is a chopping pulse applied to the coil 209 by the stepping motor control device 100 so as to rotate the rotor 202 by approximately 180 degrees.

For example, the normal drive pulse NP is a chopping pulse having 5 pulses with a cycle of 0.5 ms (millisecond) and a duty ratio of 50% (percent).

The normal drive pulse NP is applied to move the hand by a predetermined angle. For example, when the stepping motor control device 100 drives the hand 155 (for example, the second hand), the stepping motor control device 100 applies the normal drive pulse NP to the stepping motor 151 every one second. In this case, a period from the time $t_1$ to a time $t_3$ is 1 second, and between the time $t_1$ and a time $t_2$, the stepping motor control device 100 applies the normal drive pulse NP to the coil 209, and subsequently, from the time $t_3$ to a time $t_4$, the stepping motor control device 100 applies the normal drive pulse NP to the coil 209.

[Fixed Pulse FP]

Figure 4:
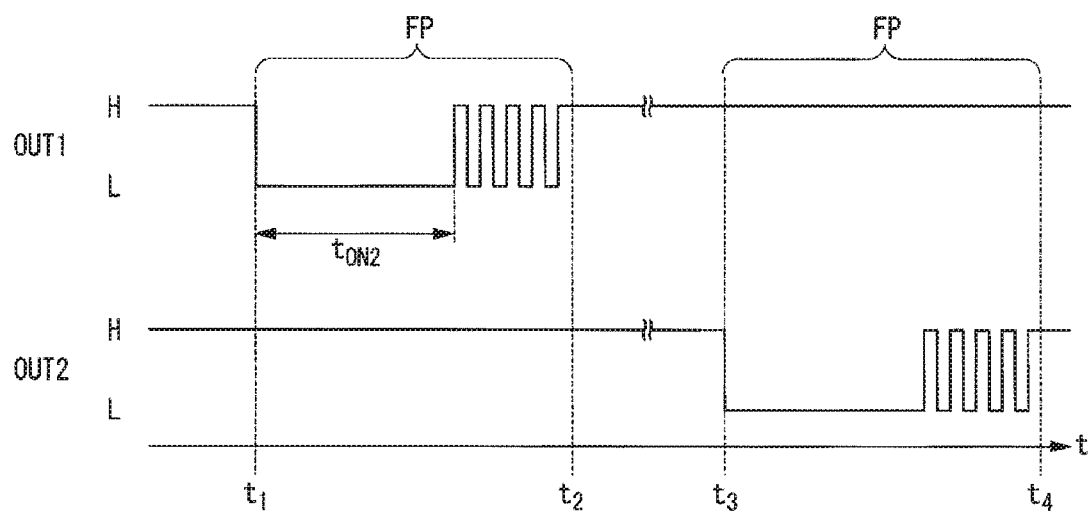
FIG. 4 is a diagram showing an example of a fixed pulse according to the embodiment.

FIG. 4 is a diagram showing an example of the fixed pulse FP according to the embodiment.

The fixed pulse FP is a drive pulse used in a case where the hand 155 is fast-forward normally rotated, a case where the hand 155 is reversed, or the like.

In this example, an on-time $t_{ON2}$ of the fixed pulse FP is longer than the on-time $t_{ON1}$ of the normal drive pulse NP.

That is, the fixed pulse FP drives the stepping motor 151 with an energy larger than that of the normal drive pulse NP.

A cycle of the fixed pulse FP may be different from the cycle of the normal drive pulse NP. For example, in the case of fast-forward normal rotation, the cycle of the fixed pulse FP becomes shorter than the normal drive pulse NP. When the fast-forward normal rotation is performed, the period from the time $t_1$ to the time $t_3$ is shorter than one second. Therefore, the cycle of the fixed pulse FP may be shorter than the cycle of the normal drive pulse NP. Further, in cases other than the fast-forward normal rotation, the cycle of the fixed pulse FP may coincide with the cycle of the normal drive pulse NP.

Further, the fixed pulse FP may or may not perform chopping driving. In this example, the on-time $t_{ON2}$ of the fixed pulse FP is longer than the on-time $t_{ON1}$ of the normal drive pulse NP, and then chopping driving is performed. However, it is also possible that the fixed pulse FP may not perform chopping driving.

In this example, the fixed pulse FP broadly includes drive pulses other than the normal drive pulse NP, such as a pulse that drives the rotor 202 in a reverse manner.

[Degaussing Pulse DP]

As described above, the stepping motor control device 100 applies the drive pulse to the stepping motor 151. The energy of the fixed pulse FP is larger than the energy of the normal drive pulse NP. In the fixed pulse FP, a current larger than that of the normal drive pulse NP passes through the coil 209, so that a magnetic field generated in the stator 201 is also large.

When the stepping motor control device 100 applies the drive pulse to the stepping motor 151, as the applied energy becomes larger, the magnetic flux (residual magnetic flux) remaining in the saturable portions 210 and 211 of the stator 201 increases.

Therefore, since the energy of the fixed pulse FP is larger than that of the normal drive pulse NP, the residual magnetic flux remaining in the case where the fixed pulse FP is applied is more than that in the case where the normal drive pulse NP is applied.

When the residual magnetic flux remains in the saturable portions 210 and 211 due to the application of the fixed pulse FP, this residual magnetic flux cancels the magnetic flux generated by the drive pulse applied next to the fixed pulse FP. Therefore, in order to rotate the rotor 202, the stepping motor control device 100 must give the coil 209 an energy for canceling the residual magnetic flux and energy for rotating the rotor 202.

The degaussing pulse DP is a pulse applied to the coil 209 for canceling the residual magnetic flux. In the present embodiment, the drive pulse is corrected by adding the degaussing pulse DP.

The addition of the degaussing pulse DP means adding the energy for canceling the residual magnetic flux to the normal drive pulse NP. For example, by further adding a pulse to the normal drive pulse NP, the energy for canceling the residual magnetic flux is added to the normal drive pulse NP.

The degaussing pulse DP may be added by increasing a voltage of the normal drive pulse. Further, the degaussing pulse DP may be added by increasing a pulse width of the normal drive pulse.

Figure 5:
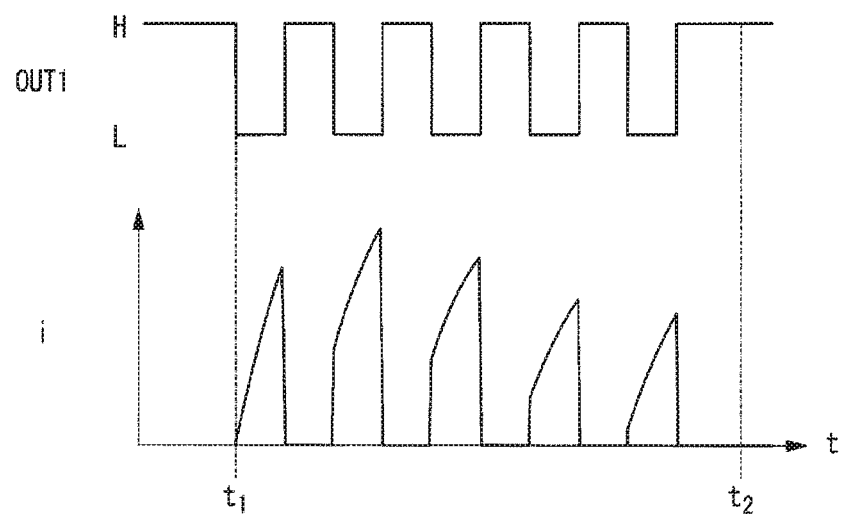
FIG. 5 is a diagram showing an example of a value of a current flowing in a coil when the normal drive pulse is supplied to the stepping motor after a hand is moved due to the normal drive pulse according to the embodiment.

FIG. 5 is a diagram showing an example of a value of a current flowing in the coil 209 when the normal drive pulse NP is supplied to the stepping motor 151 after a hand is moved due to the normal drive pulse NP according to the embodiment. The figure also shows the potential of the first terminal OUT1 of the coil 209 and a value of the current flowing through the coil 209 from the time $t_1$ to the time $t_2$ shown in FIG. 3.

In this example, a drive pulse applied before the normal drive pulse NP is applied (that is, before the time $t_1$) is the normal drive pulse NP. Therefore, the value of the current flowing through the coil 209 shown in the figure is a current flowing through the coil 209 when no residual magnetic flux remains in the stator 201.

Figure 6:
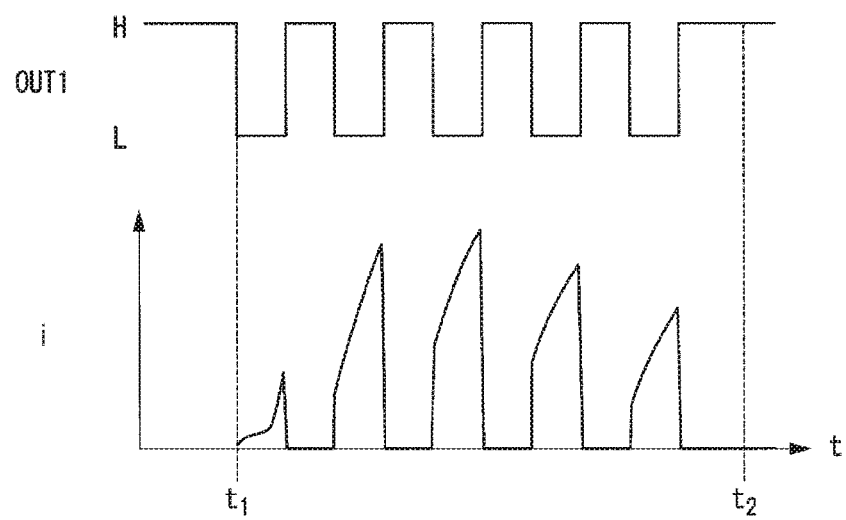
FIG. 6 is a diagram showing an example of a value of a current flowing in the coil when the normal drive pulse is supplied to the stepping motor after the hand is moved due to the fixed pulse according to the embodiment.

FIG. 6 is a diagram showing an example of a value of a current flowing in the coil 209 when the normal drive pulse NP is supplied to the stepping motor 151 after a hand is moved due to the fixed pulse FP according to the embodiment. The figure also shows the potential of the first terminal OUT1 of the coil 209 and a value of the current flowing through the coil 209 from the time $t_1$ to the time $t_2$ shown in FIG. 3.

In this example, the drive pulse applied before the normal drive pulse NP is applied (that is, before the time $t_1$) is the fixed pulse FP. Therefore, the residual magnetic flux remains particularly in the saturable portions 210 and 211 of the coil 209 shown in the same figure. In this case, the current flowing through the coil 209 is smaller than that when no residual magnetic flux remains (that is, the current i in FIG. 5).

Specifically, a first pulse of the normal drive pulse NP at the time $t_1$ is used as the degaussing pulse DP for degaussing the residual magnetic flux, and the current that should flow through the coil 209 does not flow sufficiently. This may cause a problem that the stepping motor control device 100 cannot give the energy required for the rotation of the rotor 202.

[Magnetic Flux Generated in Stator 201 and Rotation of Rotor 202 when Normal Drive Pulse NP is Supplied to Stepping Motor 151 after Hand is Moved Due to Normal Drive Pulse NP]

Figure 7:
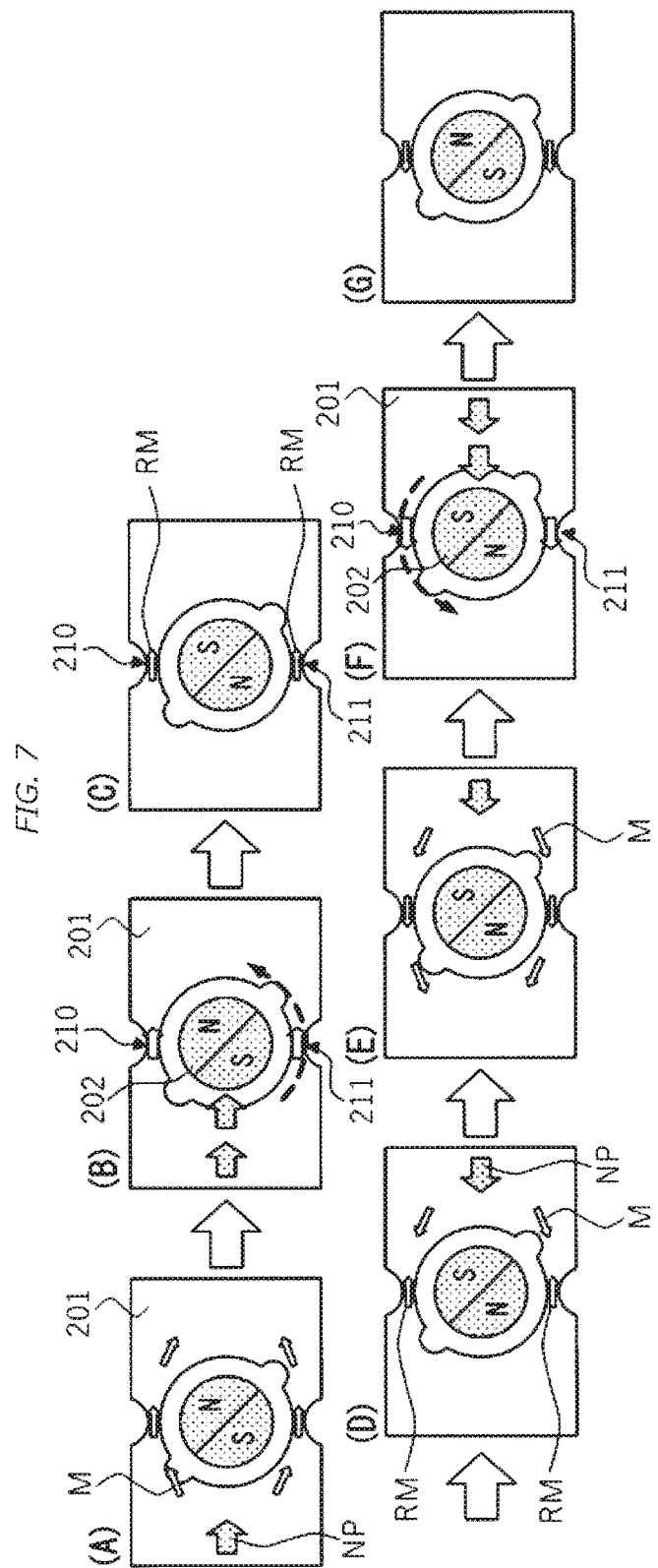
FIG. 7 is a diagram showing an example, in time series, of a situation that a rotor rotates when the normal drive pulse is supplied to the stepping motor after the hand is moved due to the normal drive pulse according to the embodiment.

FIG. 7 is a diagram showing an example, in time series, of a situation that the rotor 202 rotates when the normal drive pulse NP is supplied to the stepping motor 151 after the hand is moved due to the normal drive pulse NP according to the embodiment.

When the normal drive pulse NP is applied, a magnetic flux M as indicated by arrows in the figure is generated in the stator 201 (A). After that, when the saturable portions 210 and 211 are saturated and the magnetic resistance of the saturable portions 210 and 211 increases, the magnetic poles generated in the stator 201 and the magnetic poles of the rotor 202 interact with each other (B), and the rotor 202 rotates counterclockwise and stops in a state of rotating about 180 degrees (C). In this case, residual magnetic fluxes RM are generated in the saturable portions 210 and 211 (C), but magnitude thereof is negligible.

Next, the normal drive pulse NP is applied in an opposite direction (D). In this case, the residual magnetic fluxes RM are negligible, and thus do not affect magnitude of a magnetic field M generated by the normal drive pulse NP (or can be ignored). Therefore, the magnetic field M as shown by arrows in the figure is generated (E). After that, when the saturable portions 210 and 211 are saturated and the magnetic resistance of the saturable portions 210 and 211 increases, the magnetic poles generated in the stator 201 and the magnetic poles of the rotor 202 interact with each other (F), and the rotor 202 rotates counterclockwise and stops in the state of rotating about 180 degrees (G).

[Magnetic Flux Generated in Stator 201 and Rotation of Rotor 202 when Normal Drive Pulse NP is Supplied to Stepping Motor 151 after Hand is Moved Due to Fixed Pulse FP]

Figure 8:
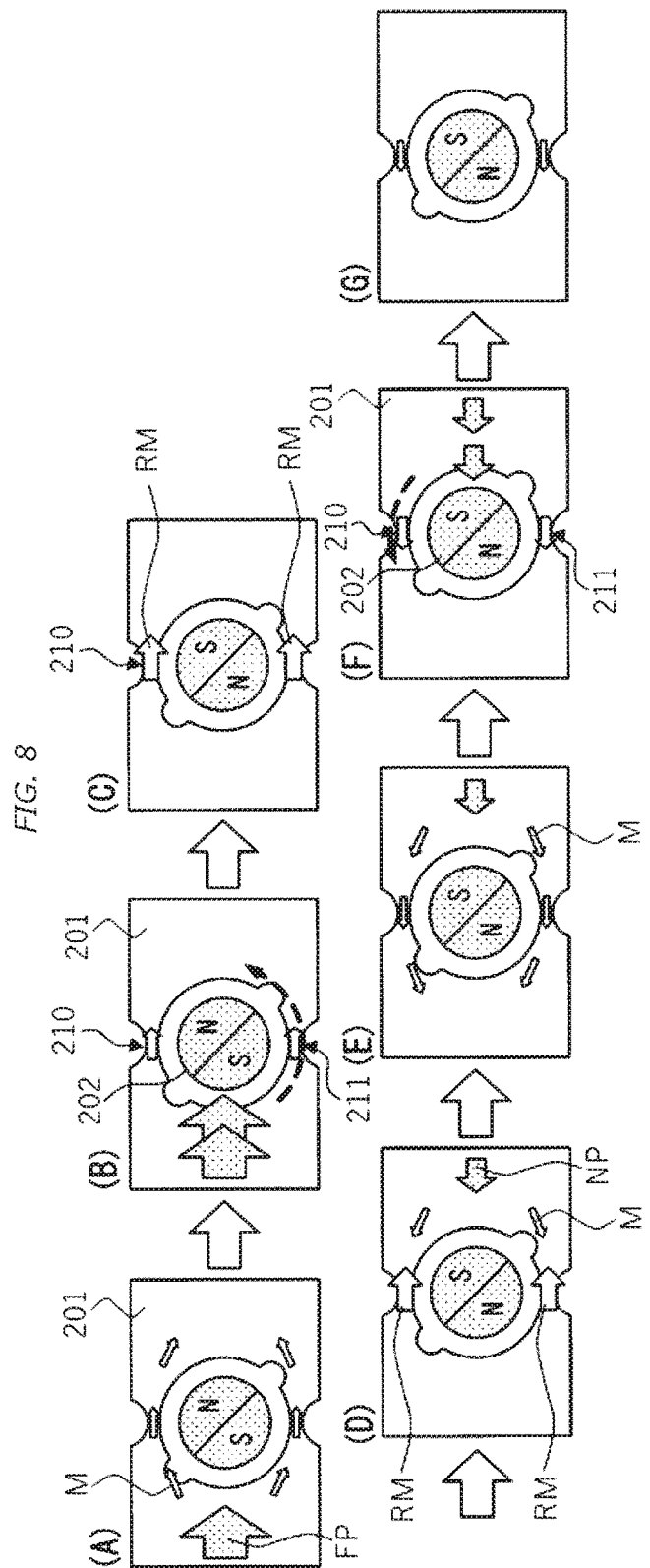
FIG. 8 is a diagram showing an example, in time series, of a situation that the rotor rotates when the normal drive pulse is supplied to the stepping motor after the hand is moved due to the fixed pulse according to the embodiment.

FIG. 8 is a diagram showing an example, in time series, of a situation that the rotor 202 rotates when the normal drive pulse NP is supplied to the stepping motor 151 after the hand is moved due to the fixed pulse FP according to the embodiment.

When the fixed pulse FP is applied, the magnetic flux M as indicated by arrows in the figure is generated in the stator 201 (A). After that, when the saturable portions 210 and 211 are saturated and the magnetic resistance of the saturable portions 210 and 211 increases, the magnetic poles generated in the stator 201 and the magnetic poles of the rotor 202 interact with each other (B), and the rotor 202 rotates counterclockwise and stops in a state, that is shown in FIG. 8(C), of rotating about 180 degrees (C). In this case, the energy due to the fixed pulse FP is larger than the energy due to the normal drive pulse NP, so that the residual magnetic fluxes RM are generated in the saturable portions 210 and 211 (C).

Next, the normal drive pulse NP is applied in an opposite direction (D). In this case, since the residual magnetic fluxes RM are generated in the saturable portions 210 and 211, the magnetic field M generated due to the normal drive pulse NP is canceled by the residual magnetic fluxes RM (E). Therefore, the magnitude of the magnetic field M generated due to the normal drive pulse NP does not provide enough the energy for rotating the rotor 202.

That is, the normal drive pulse NP gives a force that causes the rotor 202 to rotate counterclockwise (F), but the force is not large enough for the rotor 202 to rotate about 180 degrees. As a result, after the normal drive pulse NP is applied, the rotor 202 cannot rotate about 180 degrees, and stops in a state before the normal drive pulse NP is applied (state of (C)) (G).

The stepping motor control device 100 determines whether or not to add the degaussing pulse DP to the normal drive pulse NP based on whether the drive pulse applied before the normal drive pulse NP is the normal drive pulse NP or the fixed pulse FP.

Figure 9:
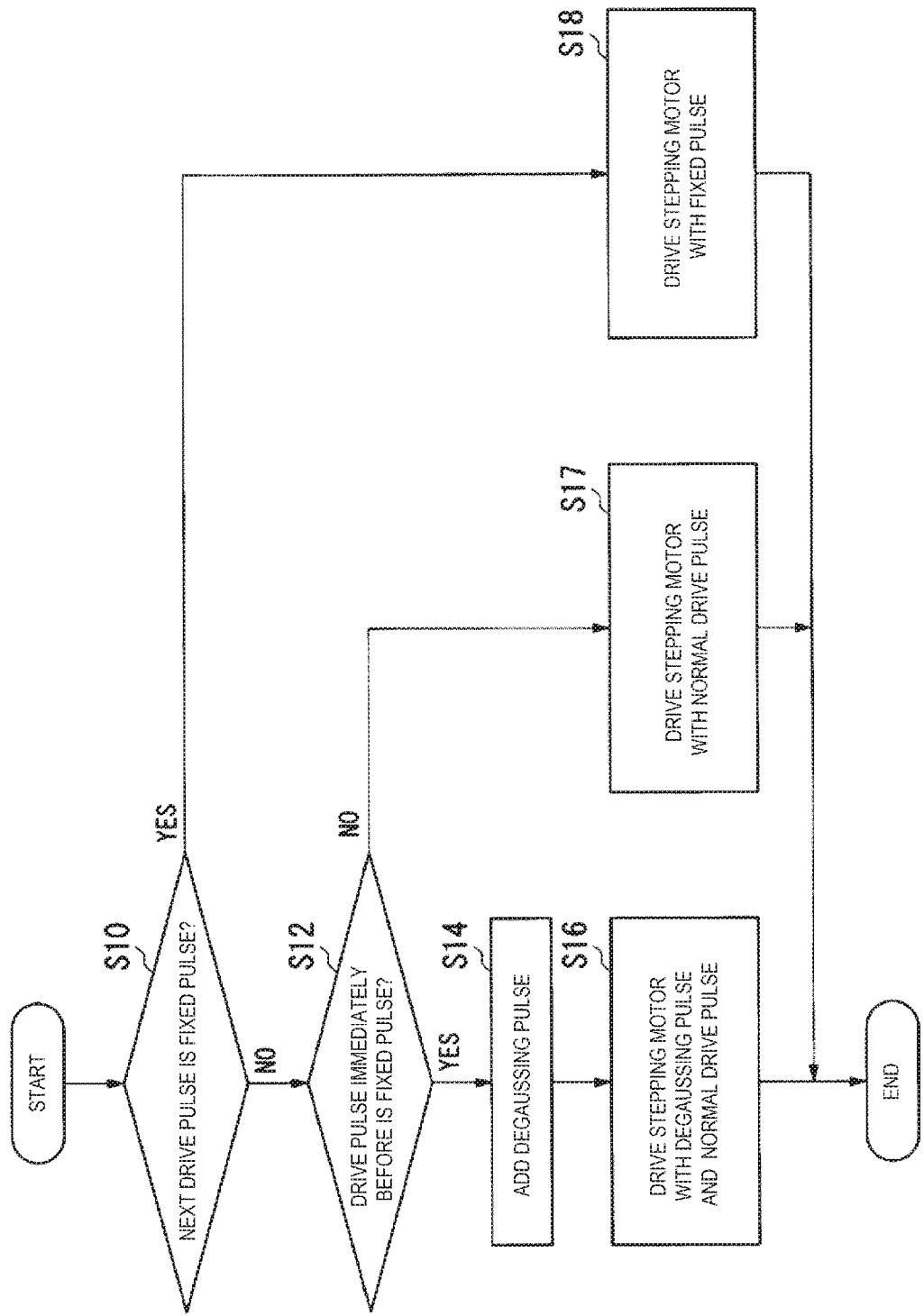
FIG. 9 is a diagram showing an example of a series of operations of drive control of the stepping motor according to the embodiment.

FIG. 9 is a diagram showing an example of a series of operations of drive control of the stepping motor according to the embodiment.

[Determination when Degaussing Pulse DP is to be Added]

(Step S10) The control circuit 103 transmits information related to a next drive pulse to the determination unit 51 and the drive control unit 52. The determination unit 51 determines whether or not the information related to the next drive pulse is the fixed pulse FP. When the next drive pulse is not the fixed pulse FP (that is, step S10; NO), the determination unit 51 progresses the process to step S12. When the next drive pulse is the fixed pulse FP (that is, step S10; YES), the determination unit 51 progresses the process to step S18.

(Step S12) The determination unit 51 determines whether or not a drive pulse immediately before is the fixed pulse FP. Specifically, the determination unit 51 determines whether the information of the previous drive pulse stored in the previous drive pulse storage unit 510 is the normal drive pulse NP or the fixed pulse FP. The determination unit 51 transmits a determined result to the drive control unit 52. When the drive pulse immediately before is not the fixed pulse FP (that is, step S12; NO), the determination unit 51 progresses the process to step S17. When information of the drive pulse immediately before is the fixed pulse FP (that is, step S12; YES), the determination unit 51 progresses the process to step S14.

(Step S14) The drive control unit 52 adds the degaussing pulse DP based on the information received from the determination unit 51. In this example, when the information received from the determination unit 51 indicates that the drive pulse immediately before is the fixed pulse FP, the drive control unit 52 adds the predetermined degaussing pulse DP to the normal drive pulse NP.

The energy of the degaussing pulse DP added at this time may be calculated by the calculation unit 53. In that case, that is, the calculation unit 53 decides the energy of the degaussing pulse DP based on the energy of the fixed pulse FP applied before the normal drive pulse NP. Further, the drive control unit 52 adds the degaussing pulse DP decided by the calculation unit 53 to the next normal drive pulse NP to which the fixed pulse FP is applied.

Note that a plurality of degaussing pulses may be added to one normal drive pulse NP. In that case, the calculation unit 53 may reduce a magnitude of the degaussing pulse DP to be added in a stepwise manner. For example, the degaussing pulse DP may be added to the next normal drive pulse NP of the fixed pulse FP, and a smaller degaussing pulse DP may be added to the normal drive pulse NP that is further next.

That is, in that case, the calculation unit 53 adds the degaussing pulse DP having the energy determined based on the energy of the fixed pulse FP applied before the normal drive pulse NP to the normal drive pulse NP, and adds a second degaussing pulse DP having an energy smaller than that of the degaussing pulse DP to the normal drive pulse NP that is further next.

Figure 10:
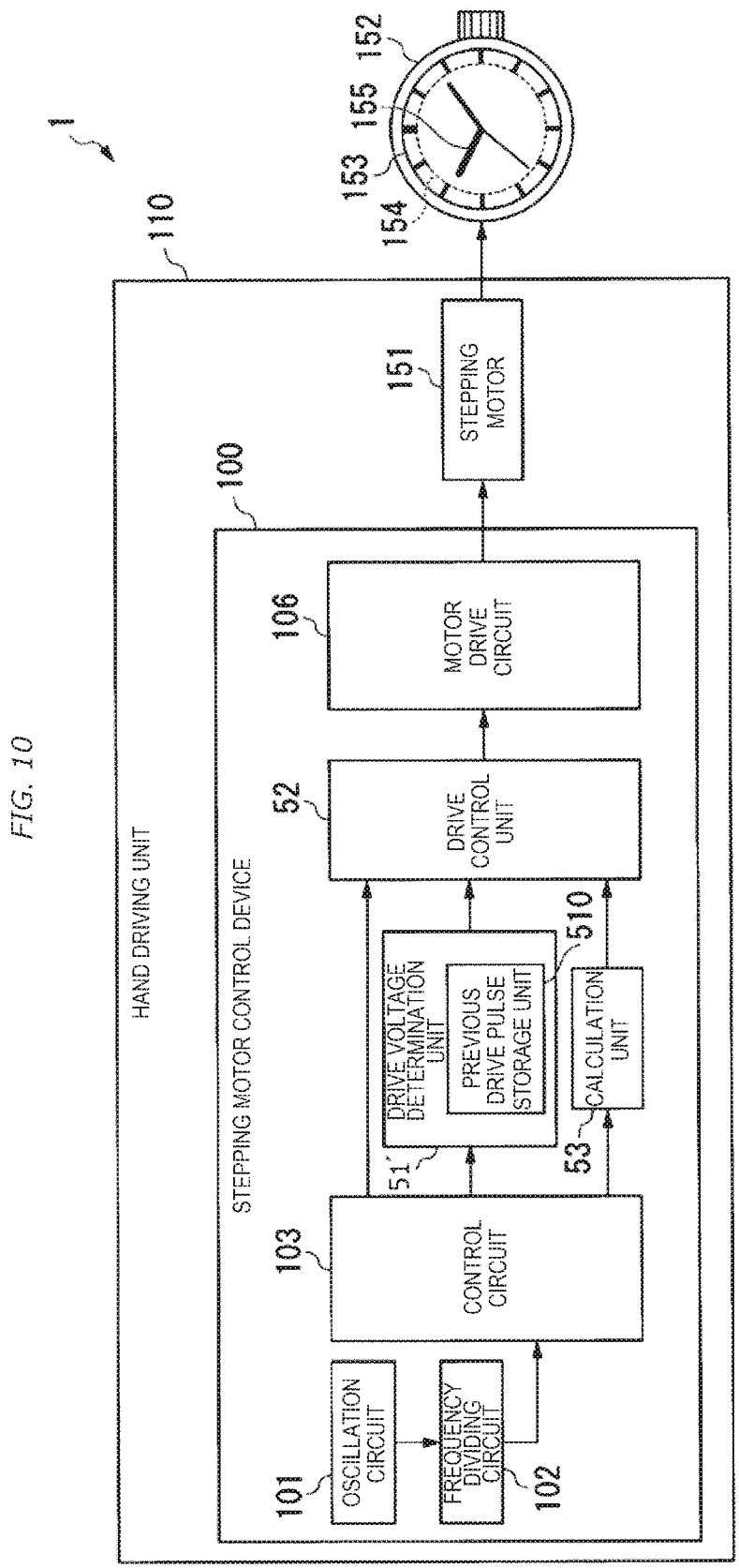
FIG. 10 is a diagram showing an example of a configuration of a timepiece according to another embodiment.

Further, the energy of the degaussing pulse DP is decided by the voltage of the pulse, the duty ratio of the pulse, or a length of the on-time of the pulse. For example, when the energy of the degaussing pulse DP is controlled by the voltage, the calculation unit 53 may decide a voltage value of the degaussing pulse DP based on the energy of the fixed pulse FP applied before the normal drive pulse NP. In that case, a drive voltage determination unit 51' (FIG. 10) may be provided to determine the voltage of the normal drive pulse NP based on whether or not the pulse applied before the normal drive pulse NP is the fixed pulse FP. That is, the drive voltage determination unit 51' determines to increase the voltage of the normal drive pulse NP or to keep the voltage of the normal drive pulse NP as it is based on whether or not the pulse applied before the normal drive pulse NP is the fixed pulse FP. FIG. 10 is a diagram showing an example of a configuration of a timepiece according to another embodiment of the invention. The drive voltage determination unit 51' shown in FIG. 10 functions in a manner same as the determination unit 51 except that it determines whether or not to increase the voltage of the normal drive pulse NP.

(Step S16) The drive control unit 52 controls the motor drive circuit 106 to drive the stepping motor 151 with the degaussing pulse DP and the normal drive pulse NP, and ends the process.

(Step S17) The drive control unit 52 controls the motor drive circuit 106 to drive the stepping motor 151 with the normal drive pulse NP, and ends the process.

(Step S18) The drive control unit 52 controls the motor drive circuit 106 to drive the stepping motor 151 with the fixed pulse FP, and ends the process.

The drive control unit 52 selectively applies the normal drive pulse NP, the fixed pulse FP, or the degaussing pulse DP and the normal drive pulse NP. That is, the drive control unit 52 drives the stepping motor 151 with the normal drive pulse NP or the fixed pulse FP based on a determination result of the determination unit 51.

FIGS. 11A to 11D are diagrams respectively showing examples of cases where the normal drive pulse and the fixed pulse are respectively applied in order according to the embodiment.

Figure 11A:
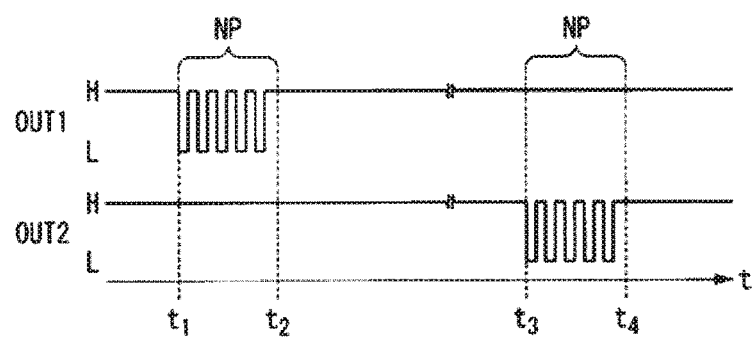
FIG. 11A is a diagram showing an example of a case where the normal drive pulse and the fixed pulse are respectively applied in order according to the embodiment.

FIG. 11A shows a case where the normal drive pulse NP is applied after the normal drive pulse NP. Processing at the time $t_3$ in this case will be described.

Since the next drive pulse is not the fixed pulse FP (that is, step S10 in FIG. 9; NO) and the pulse immediately before is not the fixed pulse FP (that is, step S12 in FIG. 9; NO) in the control circuit 103, the drive control unit 52 controls the motor drive circuit 106 to output the normal drive pulse NP to drive the stepping motor 151 (that is, step S17 in FIG. 9).

Figure 11B:
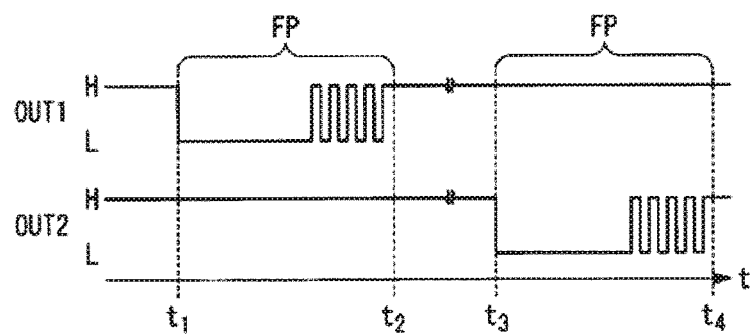
FIG. 11B is a diagram showing an example of a case where the normal drive pulse and the fixed pulse are respectively applied in order according to the embodiment.

FIG. 11B shows a case where the fixed pulse FP is applied after the fixed pulse FP. Processing at the time $t_3$ in this case will be described.

Since the next drive pulse is the fixed pulse FP in the control circuit 103 (that is, step S10 in FIG. 9; YES), the drive control unit 52 controls the motor drive circuit 106 to output the fixed pulse FP to drive the stepping motor 151 (that is, step S18 in FIG. 9).

Figure 11C:
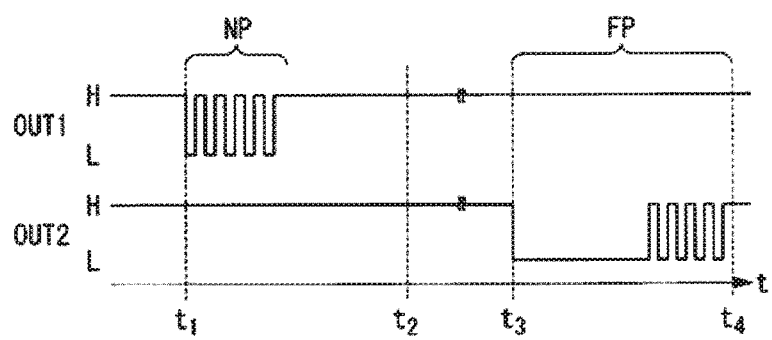
FIG. 11C is a diagram showing an example of a case where the normal drive pulse and the fixed pulse are respectively applied in order according to the embodiment.

FIG. 11C shows a case where the fixed pulse FP is applied after the normal drive pulse NP. Processing at the time $t_3$ in this case will be described.

Since the next drive pulse is the fixed pulse FP in the control circuit 103 (that is, step S10 in FIG. 9; YES), the drive control unit 52 controls the motor drive circuit 106 to output the fixed pulse FP to drive the stepping motor 151 (that is, step S18 in FIG. 9).

Figure 11D:
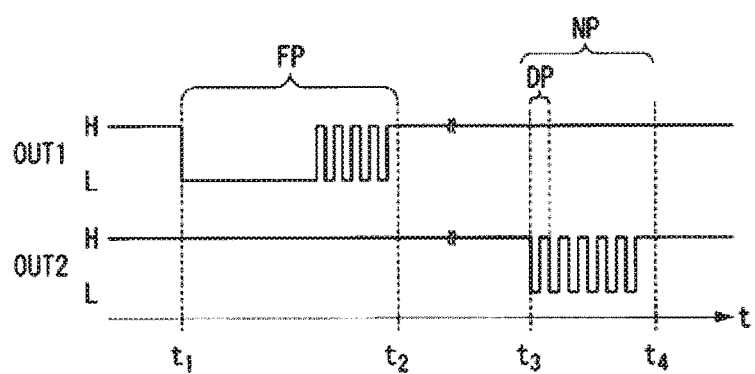
FIG. 11D is a diagram showing an example of a case where the normal drive pulse and the fixed pulse are respectively applied in order according to the embodiment.

FIG. 11D shows a case where the normal drive pulse NP is applied after the fixed pulse FP. Processing at the time $t_3$ in this case will be described.

Since the next drive pulse is not the fixed pulse FP (that is S10 in FIG. 9; NO) and the pulse immediately before is the fixed pulse FP (that is, step S12 in FIG. 9; YES) in the control circuit 103, the drive control unit 52 adds the predetermined degaussing pulse DP to the normal drive pulse NP (that is, step S14 in FIG. 9).

The drive control unit 52 drives the stepping motor 151 by causing the motor drive circuit 106 to output the normal drive pulse NP to which the degaussing pulse DP is added with the degaussing pulse DP and the normal drive pulse NP (that is, step 18 in FIG. 9).

Overview of Effects of Embodiment

As described above, the stepping motor control device 100 decides whether or not to add the degaussing pulse DP based on whether the drive pulse immediately before is the normal drive pulse NP or the fixed pulse FP.

According to the above-described embodiment, the stepping motor control device 100 includes the determination unit 51 and the drive control unit 52 to control the stepping motor 151 based on the previous drive pulse. When the previous drive pulse is the fixed pulse FP, the stepping motor control device 100 adds the degaussing pulse DP for canceling the residual magnetic flux to the drive pulse. When the previous drive pulse is the normal drive pulse NP, the stepping motor control device 100 does not add the degaussing pulse DP to the drive pulse.

When the previous drive pulse is the fixed pulse FP, the stepping motor control device 100 adds the degaussing pulse DP for canceling the residual magnetic flux to the drive pulse. Therefore, energy shortage does not occur when the stepping motor 151 is driven.

Further, the stepping motor control device 100 determines whether or not to add the degaussing pulse DP depending on whether the previous drive pulse is the normal drive pulse NP or the fixed pulse FP. Therefore, unnecessary energy is not consumed. Therefore, the stepping motor control device 100 can perform control with high energy efficiency.

Further, according to the above-described embodiment, the fixed pulse FP has an on-time in one cycle longer than that of the normal drive pulse NP. In this case, the residual magnetic flux generated in the saturable portions 210 and 211 after the fixed pulse FP is applied is larger than the residual magnetic flux generated after the normal drive pulse NP is applied.

When the previous drive pulse is the fixed pulse FP, the stepping motor control device 100 adds the degaussing pulse DP for canceling the residual magnetic flux to the drive pulse. Therefore, the stepping motor control device 100 can cancel the residual magnetic flux.

Further, according to the above-described embodiment, both the normal drive pulse NP and the fixed pulse FP may be applied to the second hand. In that case, the cycle of the normal drive pulse NP and the cycle of the fixed pulse FP coincide with each other.

The fixed pulse FP is used not only in the case where the hand 155 is fast-forward normally rotated or reversed, but also in a case where the hand 155 is driven in a cycle same as that of the normal drive pulse NP. That is, even when the cycle of the fixed pulse FP is the same as the cycle of the normal drive pulse NP, the energy of the fixed pulse FP may be larger than the energy of the normal drive pulse NP. In that case, the residual magnetic flux may be generated in the saturable portions 210 and 211 after the fixed pulse FP is applied.

Even in such a case, the stepping motor control device 100 can cancel the residual magnetic flux by adding the degaussing pulse DP to the normal drive pulse NP.

Further, according to the above-described embodiment, the cycle of the fixed pulse FP may be different from the cycle of the normal drive pulse NP. In the present embodiment, due to presence of a case of fast-forward normal rotation, the hand 155 has a drive cycle that is not fixed.

The stepping motor control device 100 adds the degaussing pulse DP to the normal drive pulse NP applied after the fixed pulse FP having higher energy than that of the normal drive pulse NP is applied. Therefore, the stepping motor control device 100 can cancel the residual magnetic flux even when drive frequencies of the normal drive pulse NP and the fixed pulse FP are different.

Further, according to the above-described embodiment, the stepping motor control device 100 includes the calculation unit 53. The calculation unit 53 decides the energy of the degaussing pulse DP based on the energy of the fixed pulse FP applied before the normal drive pulse NP. The stepping motor control device 100 includes the calculation unit 53, so that the energy of the degaussing pulse DP can be decided.

Therefore, the stepping motor control device 100 includes the calculation unit 53, so that the degaussing pulse DP having the energy required for canceling the residual magnetic flux can be added. That is, the stepping motor control device 100 can be controlled with high energy efficiency.

Further, according to the above-described embodiment, the calculation unit 53 reduces the magnitude of the degaussing pulse DP in the stepwise manner. The stepping motor control device 100 adds the degaussing pulse DP to the normal drive pulse NP next to the fixed pulse FP, and adds the smaller degaussing pulse DP to the normal drive pulse NP that is further next.

Therefore, the stepping motor control device 100 can cancel the residual magnetic flux by the next normal drive pulse NP even when the residual magnetic flux cannot be canceled by one normal drive pulse NP.

Further, according to the above-described embodiment, the stepping motor control device 100 decides the energy of the degaussing pulse DP depending on the voltage of the pulse. Accordingly, the energy used for canceling the residual magnetic flux can be applied with higher accuracy. Therefore, the stepping motor control device 100 can degauss with higher accuracy by deciding the energy of the degaussing pulse DP depending on the voltage of the pulse.

According to the above-described embodiment, the normal drive pulse NP cancels the residual magnetic flux by increasing the voltage of the normal drive pulse NP instead of adding the degaussing pulse DP.

Therefore, the stepping motor control device 100 can degauss the residual magnetic flux by applying the normal drive pulse NP having a larger voltage even when the pulse having a time same as the normal drive pulse NP is applied.

All or a part of functions of the timepiece 1 described above may be recorded as a program on a computer-readable recording medium, and the program may be executed by a computer system. The computer system includes hardware such as an OS and peripheral devices. The computer-readable recording medium includes, for example, a portable medium such as a flexible disk, a magneto-optical disk, a read only memory (ROM), and a CD-ROM, a storage device such as a hard disk built in the computer system, and a volatile memory (random access memory: RAM) in a server or the like on a network such as the Internet. The volatile memory is an example of a recording medium that holds a program for a certain period of time.

The program described above may be transmitted to another computer system via a transmission medium, for example, a network such as the Internet or a communication line such as a telephone line.

In addition, the program may be a program that implements all or a part of the functions described above. The program that implements a part of the functions described above may be a program that can implement the functions described above in combination with a program recorded in advance in the computer system, that is, a so-called differential program.

Although the embodiment of the invention is described above with reference to the drawings, specific configurations are not limited to the embodiment described above, and design changes and the like within a range not departing from the gist of the invention are also included.

What is claimed is:

1. A stepping motor control device configured to drive a stepping motor, the stepping motor including:
   a stator formed with a rotor through hole;
   a rotor rotatably arranged in the rotor through hole; and
   a coil provided on the stator to magnetically energize the stator to rotate the rotor in the rotor through hole,
   the stepping motor control device configured to control energization of the stator, the stepping motor control device comprising:
   a pulse selector configured to select one type of pulse signal from a first type of pulse signal used to execute a discrete time unit movement of the rotor, a second type of pulse signal used to execute a fast-forward or reverse movement of the rotor and a third type of pulse signal used to execute the discrete time unit movement of the rotor, the third type of pulse signal comprising a degaussing pulse signal at a beginning of the third type of pulse signal, wherein the pulse selector is configured to select either the first or third type of pulse signal if a next movement of the rotor to be executed is the discrete time unit movement, based on whether or not an immediately preceding, already applied type of the pulse signals is the second type of pulse signal, and wherein the degaussing pulse signal is a pulse signal for canceling a residual magnetic flux generated in the stator by application of the immediately preceding second type of pulse signal; and a drive control circuit configured to apply a type of pulse signal selected by the pulse selector to drive the stepping motor.

2. The stepping motor control device according to claim 1, wherein the pulse sector selects the third type of pulse signal when (i) the next movement of the rotor to be executed is the discrete time unit movement and (ii) the immediately preceding, already applied type of the pulse signals is the second type of pulse signal.

3. The stepping motor control device according to claim 1, wherein a time duration during which the second type of pulse signal is turned on within one cycle of the third type of pulse signal is longer than a time duration during which the first type of pulse signal is turned on within one cycle of the first type of pulse signal.

4. The stepping motor control device according to claim 1, wherein a cycle of the first type of pulse signal and a cycle of the second type of pulse signal coincide with each other.

5. The stepping motor control device according to claim 1, wherein a cycle of the third type of pulse signal is shorter than a cycle of the first type of pulse signal.

6. The stepping motor control device according to claim 1, further comprising a calculation circuit configured to calculate an energy of the degaussing pulse signal in the third type of pulse signal to be applied, based on an energy of the immediately preceding already applied second type of pulse signal, wherein the drive control circuit is configured to apply the degaussing pulse of the calculated energy.

7. The stepping motor control device according to claim 6, wherein the pulse selector is configured to consecutively selects a series of the third type of pulse signals after selecting the second type of pulse signal, and the calculation circuit is further configured to calculate the energy of the degaussing pulse signal in the consecutively selected series of the third type of pulse signals so that the energy of the degaussing pulse signal progressively decreases in the consecutively selected series of the third type of pulse signals.

8. The stepping motor control device according to claim 6, wherein the calculation circuit is configured to calculate a voltage value of the degaussing pulse signal in the third type of pulse signal, based on the energy of the immediately preceding, already applied second type of pulse signal.

9. A timepiece comprising the stepping motor control device according to claim 1.

10. A stepping motor control device configured to drive a stepping motor, the stepping motor including:
a stator formed with a rotor through hole;
a rotor rotatably arranged in the rotor through hole; and
a coil provided on the stator to magnetically energize stator to rotate the rotor in the rotor through hole,
the stepping motor control device configured to control energization of the stator, the stepping motor control device comprising:
a drive voltage determination unit configured to, based on whether or not a pulse applied to the stepping motor before the normal drive pulse is the fixed pulse, determine a voltage of the normal drive pulse; and
a drive control unit configured to, based on a determination result of the drive voltage determination unit, drive the stepping motor with the normal drive pulse.

11. A stepping motor control method for driving a stepping motor, the stepping motor including:
a stator formed with a rotor through hole;
a rotor rotatably arranged in the rotor through hole; and
a coil provided on the stator to magnetically energize the stator to rotate in the rotor through hole,
the method comprising:
selecting one type of pulse signal from a first type of pulse signal used to execute a discrete time unit movement of the rotor, a second type of pulse signal used to execute a fast-forward or reverse movement of the rotor and a third type of pulse signal used to execute the discrete time unit movement of the rotor, the third type of pulse signal comprising a degaussing pulse signal at a beginning of the third type of pulse signal, wherein selecting one type of pulse signal comprises selecting either the first or third type of pulse signal if a next movement of the rotor to be executed is the discrete time unit movement, based on whether or not an immediately preceding, already applied type of the pulse signals is the second type of pulse signal, and wherein the degaussing pulse signal is a pulse signal for canceling a residual magnetic flux generated in the stator by application of the immediately preceding second type of pulse signal; and
applying a selected type of pulse signal to drive the stepping motor.

* * * * *